Patented Nov. 26, 1940

2,222,873

UNITED STATES PATENT OFFICE 2,222,873

WATER RESISTANT STARCH AND PROCESS

Gerald J. Leuck, Evanston, Ill., assignor, by mesne assignments, to Corn Products Refining Company, New York, N. Y., a corporation of New Jersey No Drawing. Application December 10, 1937, Serial No. 179,122

16 Claims. (Cl. 134—23.4)

This invention relates to starch products and its primary object is to provide a starch compound consisting essentially of starch and formaldehyde which is treated so that it will be highly water resistant, that is to say, substantially unaffected by prolonged contact with water; and, more particularly, to provide a starch product in paste form, which, when set or solidified by a suitable curing procedure, will be adhesive and cohesive as well as water resistant or water insoluble so that it may be used as a bonding substance, a size, an impregnating agent, a coating material, or for other like purposes where resistance to moisture, of which ordinary starch products are incapable, is a requisite. For example, the starch compound of this invention may be used as a water resistant adhesive for plywood and is incomparably better for such purposes than any adhesive heretofore produced with starch as a base.

The word "starch" when used without qualification, is meant to include not only raw starch or starch containing material, but also starch derivatives of the series from gelatinized starch to the highly soluble dextrines; and the starches which may be treated in accordance with the invention comprise all the common starches such as corn, potato, wheat, rice and tapioca starches. For example the starch substance used may be raw or low fluidity starch, thin boiling or high fluidity starch, dextrine, British gum or starch that is merely gelatinized.

The gelatinized starch referred to, may be made by passing moist raw starch between rolls heated to a superficial temperature of about 370° F., more or less, according to the method described in United States patent to Fred O. Giesecke No. 1,979,257 granted November 6, 1934.

The method of treatment provided by the present invention comprises mixing the starch, in order to form a paste, with formaldehyde, or a formaldehyde producing compound, at low pH and after pretreatment of the starch with an alkali; this pretreatment (or a dehydrating treatment according to my copending application filed December 10, 1937, Serial No. 179,121) being necessary if the desired properties are to be obtained, to-wit, a high degree of water resistance, or water insolubility, together with cohesiveness and adhesiveness.

The formaldehyde may be a readily soluble or volatile form of formaldehyde, or, preferably, the solution of formaldehyde known as formalin.

The low pH, not substantially higher than 2, has been found to be essential if high water resistance together with high degrees of cohesiveness and adhesiveness are desired, and may be obtained by use of any suitable acid or acid reacting substance. For this purpose a mineral acid like hydrochloric or sulfuric acid, or an organic acid like lactic acid, or acid reacting substance, such as an acid salt or acid reacting salt like sodium bisulfate, aluminum sulfate or acetyl chloride, may be employed if it gives a low enough pH to produce a substantial degree of insolubility or water resistance. It is preferable that the pH be below 2, or sufficiently low so that the colorimetric indicator of pH, meta cresol purple, will be turned pink, rather than yellow, by the pH attained. This low pH is necessary, however, only at the point of the procedure at which the development of water-insolubility or water-resistance is desired, and is not necessary either previous to or subsequent to this point of the procedure.

A means of operation which has been found convenient for controlling the pH in this manner is as follows: (1) A paste is prepared which comprises an aqueous medium, starch, formaldehyde, and sufficient acid to lower the pH until it has approached but is still above the pH desirable for producing the water-insoluble or water-resistant state of cure. (2) At the time this cure is wanted, the aqueous medium is evaporated, either at ordinary or at elevated temperature, to such an extent that with the increasing acid concentration the pH drops to the point desired for curing. The constitutions and proportions of the ingredients which have been employed in preparing the original paste and the conditions to which the paste has been subsequently subjected should have been so selected that, at the time of curing, conditions other than pH are also favorable to the kind of cure desired. For instance, if a high degree of cohesiveness or adhesiveness is desired in conjunction with insolubility, the proportion of aqueous medium present at the time cure takes place should be very small. (3) After the cure has been obtained, the pH, if desired, may be increased again by such means as neutralizing more or less of the acid with alkali or by washing the acid out with water.

The lowest pH which is operative in this step of my invention depends upon the particular conditions employed in applying my invention; and this pH should be high enough so that predominant action will be neither saccharification nor charring of the starch. The lower limit of pH to be employed will also be restricted by the fact that usually no larger amount of residual acid than that which has been necessary to develop the desired water-resistance, will be wanted in the final applied product.

If acids substantially weaker than hydrochloric and sulfuric acids are used, larger amounts of them must be employed in order to attain the same desired low pH. This is not ordinarily advisable. However, in certain cases a larger amount of substantially weaker acid may be advantageous. For example, in treatment with the starch product of a cloth fabric which is very sensitive to deterioration at a low pH, employment of a relatively large amount of oxalic acid instead of a trace of hydrochloric acid may allow such control of the pH as will prevent injury of the fabric.

An acid reacting salt capable of yielding a pH low enough to induce the development of water-resistance may also be advantageous in certain cases even if a relatively large amount of it must be used in order to attain this pH. For example, aluminum sulfate is generally used in relatively large proportions in ordinary paper manufacture. This acid reacting salt may therefore likewise serve advantageously as the ingredient for producing the low pH necessary for developing water-resistance when the starch, treated in accordance with this invention, is employed for the purpose of imparting water-resistant or other desired qualities to the paper.

The development of water-resistance or water-insolubility produced during the final step of the process may be brought about at ordinary room temperature or even at lower temperatures, but the use of elevated temperatures (in cases in which it is practicable to employ elevated temperatures) is usually more advantageous, for the following reasons: In general, it has been found that the higher the temperature employed, the greater the speed of development of water-resistance, and the lower the concentration of the acid or acid reacting substance needed to attain the desired degree of water-resistance. Employment of a relatively high concentration of acid substance is frequently undesirable. High speed of development of water-resistance or water-insolubility is frequently advantageous. Moreover, if conditions are such as to allow only slow development of water-resistance or water-insolubility, the necessary formaldehyde and acid substance may tend to dissipate away from the starch preparation—for instance through volatilization when the material is used in thin layers or through absorption when used in conjunction with a porous material—to such an extent that either the formaldehyde or hydrogen ion will not remain in sufficient concentration to complete the development of a satisfactory degree of water-resistance or water-insolubility.

Materials such as paper and cloth consisting essentially of cellulose tend to be adversely affected by the high degree of dehydration which takes place upon subjecting them to a substantially elevated temperature under ordinary atmospheric conditions. In the final step of the alkalied starch process a satisfactory degree of water-resistance or water-insolubility may be developed rapidly by means of elevated temperature treatment in an atmosphere containing any proportion of water vapor less than that which gives water condensation at the elevated temperature being employed. Accordingly, in the application of alkalied starch preparations as bonds, coatings or impregnations of materials which tend to be adversely affected by dry heat, elevated temperature cure of the water-resistant starch preparation to the water-resistant state may be advantageously effected in an atmosphere which contains enough water vapor to prevent excessive dehydration of the material to which the starch preparation is applied.

The water-resistant product of starch and formaldehyde obtained during the final step of the process may be pulverulent, granular or in the form of a filament, a film, a sheet, and may be applied to or be incorporated with other bodies or materials. In appearance it may vary from opacity to transparency, and in color from white to dark.

In using the process described and claimed herein, in which the starch is pretreated with an alkali, the alkali or alkaline reacting material may be any substance which, in conjunction with the starch, is capable of producing a pH of above 7. The alkali or alkaline reacting material may be applied at any suitable temperature below that at which a charring action of the starch takes place to a substantial extent. The alkali or alkaline reacting material may also be added to the starch either previously to, or subsequently to, or at the same time as, the temperature of the starch is elevated as a means of making the alkali or alkaline material react more effectively. The alkali or alkaline reacting material may likewise be applied in any medium, at any pressure or concentrations of ingredients, and by means of any manipulative procedure or condition which will in practice allow the alkali or alkaline material to attain the purpose of the invention.

The following are specific examples of the application of the invention to practice. It will be understood that these examples are merely typical and informative and are not to be considered as limiting the invention to the particulars given; it being the intention to cover all equivalents and all modifications within the scope of the appended claims.

*Example 1.*—(a) 1000 parts by weight of powdered raw corn starch having a moisture content of approximately 10% are placed in a dextrine cooker, of the usual type equipped with a fairly tight cover, and the material then treated with moisture and ammonia as follows: 3.5 parts of ammonia gas are gradually injected, in the course of an hour, with continual stirring, into the cooker, so that the starch is thereby made definitely alkaline. Heat is then applied so that the temperature of the starch is gradually raised to a maximum of approximately 300° F. in the course of 8 hours and the starch is maintained at approximately this temperature for an additional 15 hours. Additional ammonia, and water in the form of steam, are injected into the cooker during this period at such a rate as to maintain an excess of each of these constituents in the atmosphere within the cooker. This condition of excess moisture is satisfied, for example, when moisture continues to condense on the inside of the cooker lid. Continued evolution of steam with a strong odor of ammonia, passing through a small vent provided in the cooker lid, is evidence that the condition of excess of both of these constituents is being maintained. Stirring is continued throughout the heating period.

Subsequent to the first addition of ammonia, the starch should always test purple to the pH indicator meta cresol purple, as an indication of alkalinity. This test also serves as an indication that a sufficient concentration of ammonia is being maintained. No moisture except that originally present in the starch and no ammonia except the 3.5 parts originally introduced need be added until after the temperature has passed the boiling point of water. Thereafter, addition of ¼ part of ammonia per hour and addition of steam at a similar rate will ordinarily suffice if the cooker is fairly tight, to maintain moisture and ammonia at high enough concentrations.

After the heat treatment is finished the charge is brought to room temperature in a cooler and sieved in a reel according to ordinary dextrine manufacturing practice. The product obtained is a powder of a light yellow-brown color.

(b) Equal parts by weight of the above described alkali modified starch product, water and formalin are admixed with from 2 to 12 parts by weight of 8.8% aqueous hydrochloric acid per 100 parts of the modified starch used. A few minutes to a few hours after the hydrochloric acid is added, the suspension thus formed begins to thicken into a paste which subsequently becomes translucent to transparent and which is decidedly tacky. In general, the rate at which these changes occur increases as the proportion of hydrochloric acid employed is increased. A slight elevation of temperature likewise increases the rate at which these changes occur. While the preparation may be used as an adhesive immediately after addition of the hydrochloric acid, it is usually preferable, as a matter of practical convenience, to use the preparation subsequent to the time that these changes take place at least at the maximum rate.

*Applications to use.*—(c) This paste preparation may be employed as an adhesive for bonding plywood by applying it to the wood and curing in a hot press in the usual manner. Upon employing a 10-minute heat cure in the press at 248° F. (120° C.) in connection with 6.9 parts of 8.8% aqueous hydrochloric acid per 100 parts of the modified starch in the adhesive paste, or a 10-minute cure in the press at 284° F. (140° C.) in connection with 4.6 parts of this acid solution per 100 parts of the modified starch, a plywood bond is obtained which is as strong as the wood, when the latter is dry, and which retains its strength when the plywood structure is wet from soaking in water for several days. In general, if a higher temperature cure is employed, the amount of hydrochloric acid used should be reduced; and if a lower temperature or a shorter time of cure is employed, the amount of hydrochloric acid used should be increased. In any case under the conditions specified in this and subsequent examples, the pH at the time water insolubility is developed will be at 2 or lower.

(d) This adhesive paste preparation may also be used for producing water-resistant bonds, single or multiple, of paper, cloth and other fabrics, and for the treatment of single sheets or bodies to make them water-resistant and to stiffen them if need be. For the purpose of easier application to these materials, it is sometimes advisable to employ a thinner paste preparation, which may be obtained by adding more water either at the same time as, or previous to, or subsequent to, the mixing of the modified starch with the formalin and the acid. Addition of more water, however, will in general tend to decrease the water resistant strength of the bond.

The cure may be accomplished at elevated temperature and either with or without employment of pressure. In obtaining cures in conjunction with materials generally, as in the case of plywood preparation, the more acid that is used, the shorter will be the time and the lower the temperature necessary for producing the cure. Cures produced without any elevation of temperature may be satisfactorily obtained if no very high degree of water-resistant strength is necessary; or if the fabric or other material to be treated is not injured by the relatively high proportion of hydrochloric acid necessary in order to obtain a high degree of water resistance.

(e) Another procedure satisfactory for employing the alkali modified starch described in this example, in conjunction with formaldehyde and hydrochloric acid, for the purpose of water-resistant coating and bonding, is the following, which is particularly advantageous with materials like paper and cloth: The modified starch is first made into a gelatinized paste by heating say 5 or 10 parts of the modified starch with 100 parts of water at a temperature of 158° F. (70° C.) or higher in a manner similar to the usual process whereby ordinary raw starch is made into a hot water gelatinized paste. The paste so obtained is then applied to the surface or surfaces of the material to be coated or bonded by known means such as dipping, spraying, or brushing. At this point it is usually advantageous to dry out in some degree the water present in the applied paste. Formalin and hydrochloric acid are then distributed on this applied starch by known means such as dipping, spraying or brushing. The formalin and hydrochloric acid may each be applied separately in this way, either one before the other; although it will usually be advantageous to apply both at the same time as a single solution, and in weight ratio to each other and to the modified starch, similar to the proportions used in the other procedure described hereinbefore. Then, subsequent to additional drying at this point if desired, the materials to be coated or bonded are assembled into the desired form and cured as described hereinabove. With such materials as paper, cloth or wood veneer, this procedure yields very satisfactory water-resistance in separate sheets of the materials thus coated, and very satisfactory water-resistant strength if the object is to form laminated articles by means of single or multiple bonds. With comminuted materials such as wood pulp, wood flour, exploded wood fiber, sugar cane bagasse, cotton linters, or cork powder, very satisfactory results are obtained in producing water-resistant coating of the particles or in bonding them together into water-resistant masses formed into the desired shape by means of pressure or otherwise.

The separate application of the water paste of the alkali modified starch to these materials is particularly advantageous with respect to obtaining high water-resistance without employing elevation of temperature to induce cure. To thus obtain a highly water-resistant cure at ordinary temperatures it is preferable to dry the modified starch thoroughly, either at ordinary or elevated temperature, subsequent to its application but previous to its contact with the formalin and hydrochloric acid.

*Example 2.*—100 parts of powdered raw corn starch having an ordinary air dry moisture content of 10% to 15% is placed in a horizontal cylinder which is closed except for a gas aperture at each end. Ammonia gas at the rate of 1 part per hour is bubbled through water, held at a temperature near its boiling point, and the gas thus moistened is continuously passed through the cylinder, which is continuously revolved as a means of mixing the ingredients. As soon as there is an odor of ammonia at the exit aperture, heat is applied to the cylinder at such a rate that the starch reaches a temperature of approximately 284° F. (140° C.) in two to three hours. The treatment is then continued at this maximum temperature for 16 hours more. The product obtained upon cooling is similar in appearance to the product of the dextrine cooker described in Example 1.

This modified starch is subjected to formaldehyde treatment under conditions of a low pH in the manner described in Example 1, and the product may be advantageously applied to the various uses described in Example 1.

Example 3.—1500 parts of powdered raw corn starch from which the free or absorbed moisture has previously been substantially removed by drying to constant weight 212° F. (100° C.) is mixed thoroughly with 75 parts of 28% aqueous ammonia and is then enclosed in an autoclave. The temperature within the autoclave is gradually increased at such a rate that in 2 hours the charge reaches a maximum temperature of approximately 275° F. (135° C.) and a maximum gauge pressure of approximately 50 lbs. per square inch. The charge is maintained at approximately this temperature and pressure for 7 hours and is then allowed to cool.

The product is subjected to formaldehyde treatment under the conditions of low pH employed in Example 1 and is thereby made advantageously applicable to such uses as are described in Example 1.

Example 4.—The procedure is the same as in Example 3 except that in the treatment with formaldehyde at a low pH, 3 parts of paraformaldehyde, a paraformaldehyde which is preferably largely soluble in water, and 7 parts of water are employed in place of 10 parts of the formalin employed in Example 3.

Example 5.—1000 parts of powdered raw corn starch having a moisture content of approximately 5% is placed in the dextrine cooker described in Example 1. The subsequent procedure of alkaline treatment is the same as that described in Example 1 except that time and temperature conditions are different in the following respects: After the beginning of application of heat the temperature of the starch is gradually raised to 335° F. in the course of 9 hours and is thereafter maintained at approximately this temperature for an additional 5 hours (instead of, as in Example 1, attaining a maximum temperature of 300° F. in the course of 8 hours) and is thereafter maintained at this temperature for 15 hours.

The product, upon employing formaldehyde under condition of low pH as described in Example 1, gives preparations of greater fluidity than the corresponding preparations of Example 1.

Example 6.—1500 parts of powdered, high fluidity, thin boiling corn starch is treated in the same way as the raw starch in Example 3 except that, in the autoclave treatment, the temperature is brought to a maximum of approximately 266° F. (130° C.) after 5 hours of gradual elevation of temperature, and the charge is maintained at this maximum temperature for only 3 hours before cooling.

The product is subjected to formaldehyde treatment under the conditions of low pH employed in Examples 1, 2 and 3. Under similar conditions of employment it produces preparations of greater fluidity than those obtained in Examples 1, 2 and 3; and this is more desirable in some uses and less desirable in others.

Example 7.—The procedure is the same as in Example 6 except that a granular, cold water pasting or gelatinized corn starch, previously prepared by known means such as passing moist, raw starch between hot rolls having a temperature of approximately 370° F. (method of U. S. Patent to Giesecke No. 1,979,257 referred to above), is employed instead of a thin boiling starch.

Example 8.—The procedure is the same as in Example 3 except that, subsequent to ammonia treatment in the autoclave, the starch is subjected to a 29-inch vacuum for 5 hours at a temperature of 194° F. (90° C.) and is then treated with formaldehyde under conditions of low pH as in Example 5.

Example 9.—75 parts of the cold water pasting starch described in Example 7 are mixed with 1500 parts of 0.4% aqueous sodium hydroxide solution and the mixture is heated at 194° F. (90° C.) for 24 hours and then dried at a similar temperature. The dark vitreous product may be used directly for preparing potentially water-resistant curing compounds by employment of the thus produced alkali starch in conjunction with formaldehyde under conditions of low pH as described above. However, a procedure preferred for this type of starch is first to suspend it in 10 times its weight of 0.5% aqueous sulfuric acid solution at room temperature for a day, then to filter and wash it thoroughly with water and allow it to dry. 20 parts of the product thereby obtained is made into a paste with 30 parts of water, 10 parts of formalin and 4 parts of 8.8% aqueous hydrochloric acid. This paste gives good results as a water-resistant plywood adhesive upon heat curing of the plywood in a press at 248° F. (120° C.) If only 5 parts instead of 10 parts of formalin are used, a plywood bond of fairly good water-resistant strength may be obtained.

Example 10.—100 parts of powdered potato starch is thoroughly mixed with 10 parts of 28% aqueous ammonia, and the mixture is placed in an autoclave. The material is gradually raised to a temperature of 230° F. (110° C.) and maintained at this temperature for 16 hours before cooling again. The product is subjected to formaldehyde treatment under the conditions of low pH employed in Examples 1, 2 and 3.

Example 11.—100 parts of the cold water pasting starch described in Example 7 is mixed with 10 parts of water and 10 parts of triethyl amine and placed in an autoclave. The autoclave is gradually heated to 275° F. (135° C.) in the course of 2 hours and is then maintained at approximately this temperature for an additional 14 hours. After cooling, the product is removed from the autoclave and is allowed to stand exposed to a current of air, or is subjected to vacuum, for several hours in order to eliminate excess amine.

20 parts of the product is mixed with 20 parts of water, 20 parts of formalin, and 6 parts of 1.8% aqueous hydrochloric acid. The paste, after standing at room temperature for a day, will give a hot press cured plywood bond of high water-resistant strength.

*Example 12.*—75 parts of an 80% water-soluble, ordinary corn dextrine are placed in 1500 parts of 0.5% aqueous ammonia. The mixture is heated to the boiling point in the course of ½ hour and kept at this temperature for an additional hour. The product is subsequently dried out at this temperature for an additional hour. This product is mixed with an equal weight of formalin and sufficient 8.8% aqueous hydrochloric acid to color the pH indicator meta cresol purple strongly pink. A relatively thin paste is obtained which cures to form highly water-resistant, transparent films, when spread in thin layers and placed in an oven at 212° F. (100° C.) for a few minutes. The films are hard and strong but somewhat brittle.

This paste is useful in cases in which a greater degree of cohesive than adhesive strength in the water-resistant product is desired.

*Example 13.*—Cold water pasting starch of the kind described in Example 7 is first dextrinized by means of an ordinary roasting procedure until it has become approximately 50% soluble in water. 100 parts of this dextrinized product in a substantially dry condition are placed in a horizontal cylinder which is closed except for a gas aperture at each end. The cylinder is a started revolving, a mild flow of nitrogen gas is started through the cylinder, and heat is applied at such a rate that the starch reaches a maximum temperature of approximately 284° F. (140° C.) in the two to three hours. After the temperature has been at maximum for about one hour, ammonia gas at the rate of 1 part per hour is also injected into the revolving cylinder. After 1½ hours of this treatment the cylinder is allowed to cool. When the temperature has dropped to 212° F. (100° C.) the addition of ammonia is stopped, but the revolution of the cylinder and the flow of nitrogen through the cylinder are continued until the temperature has dropped to near ordinary room temperature. The product, which is similar in appearance to the dextrine put into the cylinder except that it is darker in color, is treated with formaldehyde under conditions of low pH by carrying out one of the following alternative procedures:

(a) 20 parts of the alkali modified starch are mixed directly with 20 parts of formalin and 4 parts of 1.8% aqueous hydrochloric acid solution.

(b) 20 parts of the alkali modified starch are mixed with 14 parts of 0.4% aqueous sodium hydroxide solution. The temperature of the mixture is raised to 122° F. (50° C.) and this temperature maintained for an hour. The mixture is then cooled again. 20 parts of formalin and 4 parts of 1.8% aqueous hydrochloric acid solution are subsequently stirred into the mixture.

(c) 20 parts of the alkali modified starch are subjected to a current of air in a moist, warm chamber which has a temperature of 100° F. and a humidity of approximately 90%. After a day or more in the chamber, preferably after about a week, during which the product decreases in pH until it becomes slightly acid, the product is mixed with 20 parts of formalin and 1.15 parts of 8.8% aqueous hydrochloric acid solution.

The preparations thus obtained by means of the (a), (b), or (c) treatments yield highly water-resistant plywood bonds upon employing the usual hot press cure methods. However, such preparation is relatively thin and there is some tendency for it to penetrate the wood excessively before cure is effected. On the other hand, these properties make the preparation particularly suitable for use in the water-resistant coating and impregnation of individual sheets and bodies of the materials mentioned under (d) in Example 1. This preparation is likewise suitable for effecting a water-resistant bonding of these and other materials when a substantial degree of penetration is not disadvantageous.

Upon open heat cure in thin layers of the material of this formula, hard and strong but somewhat brittle, transparent films possessing a high degree of water-resistance are formed.

*Example 14.*—The procedure is the same as in Example 13 except that a cold water pasting starch, dextrinized to the point where it is 95% water-soluble, instead of 50% water-soluble as in Example 13, is subjected to the alkali treatment.

Preparations comprising the product of the alkali treatment with formalin and under conditions of low pH as described are thinner than the corresponding preparations given in Example 13, and are more advantageous in uses in which a high degree of penetration combined with subsequent water-resistance is desired.

*Example 15.*—Into a vessel which is closed except for a small gas vent, is introduced one part of powdered raw corn starch mixed with one part of 14% aqueous ammonia. The material is heated to 140° F. (60° C.) and this temperature maintained for 20 hours. The starch thus treated is filtered, is washed with water until there is no substantial amount of ammonia in the washing, and is then dried. This alkalied starch product is subjected to formaldehyde treatment under the conditions of low pH employed in Examples 1, 2 and 3. The preparations made from this product are more advantageous for some uses than those previously described because, while the pastes are relatively thick, they have a comparatively short texture and accordingly may be spread readily.

*Example 16.*—The procedure is the same as in Example 5 except that the time and elevated temperature conditions during alkaline treatment are different in the following respects: After the beginning of application of heat the temperature of the starch is gradually raised to 335° F. in the course of 7 hours and is thereafter maintained at approximately this temperature for an additional 7 hours.

This product yields preparations of still greater fluidity than the corresponding preparations of Example 5, when reacted with formaldehyde under conditions of low pH as described, for instance, in Example 1.

The alkali treatments of the starch for giving the products high fluidity, described above, as treatments precedent to reacting with formaldehyde in the production of adhesives and like products, such treatments as are specified in Examples 5 and 16, for instance might be used for imparting high fluidity to starch used for other purposes.

That is to say, it has been discovered that the alkali treatment offers a means of modifying starch so that its fluidity is increased without substantial increase of cold water-solubles content; and the starch so treated may be put to other uses than that described. A raw corn starch possessing a 1/25 (1 part of starch heat pasted in 25 parts of water) relative fluidity of 4 cc. (volume of paste flowing through a standard aperture in a standard period of time) and a 0.2% content of cold-water-solubles, has been found, upon subjection to the alkali treatment of the hereinabove described Example 1, to attain a 1/15 relative fluidity of a 2.2 cc. and a cold water-solubles content of 1.9%. Upon subjection of this raw corn starch to the alkali treatment described in Example 5, it has been found to attain a 1/15 relative fluidity of 30 cc. and a solubles content of 1.3%. Upon subjection of a like raw starch to the alkali treatment described in Example 16, it has been found to attain a 1/12 relative fluidity of 75, while the cold water-solubles content has risen to only 3.7%. The fluidity of the starch may be thus greatly increased without substantial increase in cold water solubility obtaining.

It is the intention to cover hereby all equivalents of the specific examples and all modifications within the scope of the appended claims. By the term "raw starch" is intended starch as it comes from the common wet method of obtaining starch from corn, for example, in which $SO_2$ is used in the process. By referring to the starch as in a "dry state" it is intended starch containing the amount of moisture which air dry starch will contain or less.

I claim:

1. Process of treating starch to make it when solidified, cohesive, adhesive and substantially water insoluble which comprises: reacting the starch with an alkali; and thereafter mixing it with formaldehyde and an acid.

2. Process of treating starch to make it when solidified, cohesive, adhesive and substantially water insoluble which comprises: reacting the starch with an alkali; and thereafter mixing it with formaldehyde, and an acid, the latter in quantity to give the mixture a pH not substantially above 2 when water insolubility is developed.

3. Process of treating starch to make it when solidified, cohesive, adhesive and substantially water insoluble which comprises: reacting the starch with ammonia; and thereafter mixing with it formaldehyde and an acid.

4. Process of treating starch to make it when solidified, cohesive, adhesive and substantially water insoluble which comprises: reacting the starch with ammonia; and thereafter mixing with it formaldehyde and an acid, the latter in quantity sufficient to give the mixture a pH not substantially above 2 when water insolubility is developed.

5. Process of treating starch to make it when solidified, cohesive, adhesive and substantially water insoluble which comprises: heating the starch with the gradual introduction of ammonia gas and water; and then mixing with it formaldehyde and an acid, the latter in sufficient amount to give the mixture a strong acid reaction.

6. Process for preparing an adhesive paste which on curing will be strongly adhesive, cohesive and substantially water-insoluble which comprises: first modifying the starch with an alkali and then reacting it with formaldehyde at low pH.

7. Process for preparing an adhesive paste which on curing will be strongly adhesive, cohesive and substantially water insoluble which comprises: first modifying the starch with an alkali and then reacting it with formaldehyde at a pH not substantially above 2 when water insolubility is developed.

8. Process for treating starch to make it when solidified, cohesive, adhesive and substantially water insoluble which comprises: reacting the starch with an alkali and thereafter mixing it with formaldehyde and drying it under acid conditions which give the mixture, prior to completion of the drying operation a pH not substantially above 2 when water insolubility is developed.

9. Process of treating starch to make it when solidified, cohesive, adhesive and substantially water insoluble which comprises: reacting the starch with an alkali and thereafter mixing it with formaldehyde and heating it under acid conditions which give the mixture, prior to completion of the heating operation, a pH not substantially above 2 when water insolubility is developed.

10. Process of treating starch to make it when solidified, cohesive, adhesive and substantially water insoluble which comprises: reacting the starch with an alkali and thereafter mixing it with formaldehyde and drying it by means of elevated temperature under acid conditions which give the mixture, prior to completion of the heating operation, a pH not substantially above 2 when water insolubility is developed.

11. Process of treating starch which comprises: subjecting the starch in a dry state to heat in an atmosphere containing ammonia and steam; and thereafter mixing a formaldehyde solution and an acid with the alkalied starch.

12. Process of bonding materials which comprises: treating starch with an alkali; mixing it in this state with formaldehyde and an acid substance to give the mixture a pH not substantially higher than 2 when water insolubility is developed; spreading the paste thus formed on the materials to be bonded and subjecting such materials to heat.

13. Product of alkalied starch, formaldehyde and an acid substance, which product when solidified is cohesive, adhesive and substantially water insoluble.

14. Product of alkalied raw powdered starch, formaldehyde and an acid substance, which product when solidified is cohesive, adhesive and substantially water insoluble.

15. Product of alkalied corn starch, formaldehyde and an acid substance, which product when solidified is cohesive, adhesive and substantially water insoluble.

16. Product of ammonia alkalied starch, formaldehyde and an acid substance, which product when solidified is cohesive, adhesive and substantially water insoluble.

GERALD J. LEUCK.